US010906744B2

(12) United States Patent
Grose et al.

(10) Patent No.: US 10,906,744 B2
(45) Date of Patent: Feb. 2, 2021

(54) RETRACTING AND SWIVELLING TRANSFER APPARATUS FOR ATTACHMENT TO A MOBILE CONVEYOR

(71) Applicant: Rodono Industries Ltd., Clive (CA)

(72) Inventors: Darren James Grose, Clive (CA); Cory Evan Grose, Clive (CA)

(73) Assignee: Rodono Industries Ltd., Clive (CA)

( * ) Notice: Subject to any disclaimer, the term of this patent is extended or adjusted under 35 U.S.C. 154(b) by 0 days.

(21) Appl. No.: 16/675,942

(22) Filed: Nov. 6, 2019

(65) Prior Publication Data

US 2020/0140202 A1 May 7, 2020

Related U.S. Application Data

(60) Provisional application No. 62/756,121, filed on Nov. 6, 2018.

(51) Int. Cl.
*B65G 41/00* (2006.01)
*A01C 15/00* (2006.01)
*B65G 21/14* (2006.01)

(52) U.S. Cl.
CPC .......... *B65G 41/005* (2013.01); *A01C 15/003* (2013.01); *B65G 21/14* (2013.01); *B65G 41/008* (2013.01); *B65G 2201/042* (2013.01); *B65G 2811/09* (2013.01)

(58) Field of Classification Search
CPC .... B65G 24/14; B65G 41/005; B65G 41/008; B65G 2201/042; B65G 2811/09; A01C 15/003; A01C 15/18
See application file for complete search history.

(56) References Cited

U.S. PATENT DOCUMENTS

| 7,946,416 | B2* | 5/2011 | Grose | B65G 33/24 198/671 |
| 8,272,494 | B2* | 9/2012 | Zazula | B65G 33/32 198/313 |
| 8,328,002 | B2* | 12/2012 | Rayhons | B65G 33/24 198/666 |
| 8,479,911 | B2* | 7/2013 | Friesen | B65G 41/002 198/313 |
| 8,627,947 | B2* | 1/2014 | Houssian | A01D 61/00 198/668 |
| 8,701,868 | B2* | 4/2014 | Hall | A01C 15/003 198/581 |

(Continued)

*Primary Examiner* — Gene O Crawford
*Assistant Examiner* — Keith R Campbell
(74) *Attorney, Agent, or Firm* — Ryan W. Dupuis; Ade & Company Inc.; Michael R. Williams

(57) ABSTRACT

A transfer apparatus for loading a main conveyor of an implement, for example a seed cart, includes a guide track mounted along the main conveyor, a carriage frame movable along the guide track from a deployed position aligned within an inlet opening of the main conveyor and a retracted position displaced along the main conveyor towards the discharge end from the deployed position, and a transfer conveyor including a discharge end operatively connected to the carriage frame for discharging into the inlet end of the main conveyor in the deployed position. The carriage frame including a swivel formed therein which supports the transfer duct for pivotal movement relative to the guide track about an upright swivel axis and about a lateral tilt axis in the deployed position.

20 Claims, 12 Drawing Sheets

(56) References Cited

U.S. PATENT DOCUMENTS 10,717,601 B2 * 7/2020 Kornelsen .............. B65G 15/26
2015/0351312 A1 * 12/2015 Bardi ....................... A01C 1/06
47/57.6

* cited by examiner

RETRACTING AND SWIVELLING TRANSFER APPARATUS FOR ATTACHMENT TO A MOBILE CONVEYOR

This application claims the benefit under 35 U.S.C. 119(e) of U.S. provisional application Ser. No. 62/756,121, filed Nov. 6, 2018.

FIELD OF THE INVENTION

The present invention relates to a transfer apparatus for attachment to a mobile conveyor, for example the loading conveyor of a seed cart, in which the transfer apparatus can be extended and retracted relative to the inlet end of the mobile conveyor and can be swiveled about an upright axis relative to the mobile conveyor in the extended configuration.

BACKGROUND

Most current mobile conveyors that are transported on carts for holding seed for seeding were meant to unload end dump trucks. The angle is too steep to reach under a hopper bottom trailer.

As hopper bottom trailers become more prevalent on the farm they are used more at seeding time. Some new conveyors on new seeding carts are long enough that the angle is lower so that they can reach under a hopper bottom trailer; however, many are not.

There are current solutions that try to solve this problem.

1. Attach conveyors to the bottom of the trailer to move the seed or fertilizer to the side of the trailer where the Mobile Seed conveyor can reach.

2. Extend the hopper on the mobile conveyor to reach further under a hopper bottom trailer. In some instances, the extended hopper may include an added auger therein; however, this requires the mobile conveyor to move under the hopper bottom trailer with additional weight attached to it which it was not designed to do.

3. Replace the mobile conveyor with one designed to reach far enough to get under a hopper bottom trailer. Any mobile conveyor long enough to get the geometry correct to get the angle low enough to get under a hopper bottom trailer will work; however, you cannot retrofit a 40' long conveyor onto a seed cart that is only 20' long. There are extendable retrofit conveyors available, but this solution is expensive and needs to be adapted to many different carts.

4. Another solution employed by at least one manufacturer is to slide a separate belt over the mobile one, thereby extending the reach for a horizontal portion. If the arm holding this is designed to lift the whole unit in the extended position then it can be moved to more than one hopper on the hopper bottom trailer. This solution also requires an arm designed to lift an extended belt off the ground. Otherwise the unit must be placed, extended, unload a hopper, retract, move the truck or the mobile conveyor (which usually moves the top to the wrong place) extend and unload the next hopper. Or a moving system could be added to move the weight of the whole unit along the ground laterally. All this weight becomes a major problem which prevents this solution from being an add-on.

SUMMARY OF THE INVENTION

According to one aspect of the invention there is provided a transfer apparatus for use with a main conveyor that conveys particulate material from a supply discharge to a target location, in which the main conveyor includes a main duct having an inlet opening at an inlet end of the main duct to receive the particulate material into the main conveyor and a discharge opening at an opposing outlet end of the main duct to discharge the particulate material to the target location and a main conveying member operable within the main duct to carry the particulate material along the main duct from the inlet opening to the discharge opening, the transfer apparatus comprising:

a guide track adapted to be mounted to extend in a longitudinal direction of the guide track along the main duct from a first end of the guide track in proximity to the inlet end of the main duct to an opposing second end of the guide track which is spaced along the main duct towards the outlet end of the main duct in relation to the first end of the guide track;

a carriage frame operatively connected to the guide track so as to be movable along the guide track between a retracted stored position and a deployed position;

a transfer conveyor including a transfer duct and a transfer conveying member received within the transfer duct;

the transfer duct extending between a top opening at an inlet end of the transfer duct adapted to receive the supply discharge and a discharge opening at an outlet end opposite the inlet end;

the transfer conveying member being operable within the transfer duct to carry the particulate material along the transfer duct from the top opening to discharge opening of the transfer duct;

the transfer duct being supported on the carriage frame so as to be movable with the carriage frame between the retracted stored position and the deployed position;

in the deployed position, the transfer duct extending outwardly from the inlet end of the main duct and being arranged such that the discharging opening of the transfer duct discharges into the inlet opening of the main duct;

in the retracted stored position, the carriage frame being displaced along the guide track towards the second end of the guide track relative to the deployed position such that the transfer duct extends alongside the main duct;

the carriage frame including a swivel formed therein which supports the transfer duct for pivotal movement relative to the guide track about an upright swivel axis in the deployed position.

The transfer conveyor is well suited for use with a mobile conveyor (Auger or Belt) to allow the easier unloading of hopper bottom trailers.

The present invention is believed to be most distinguished from the prior art by the ability to extend a transfer conveyor relative to the conveyor it is mounted on and then swivel once extended. Use of a mechanism to swivel the transfer conveyor from side to side while extended allows the unit to unload from 2 hoppers without moving the base of the mobile conveyor which it was not designed to do.

A drive with ground engaging wheels can be attached to swivel the transfer conveyor, but because of weight consideration, actuator cylinders within the joint of the carriage are preferred so as to allow lifting the transfer conveyor off the ground slightly for swiveling by hand. Either method would work but the transition from axial to lateral motion requires switching the mover wheel direction.

In one embodiment, the retracting or sliding function is provided by attaching a rail to the existing mobile conveyor (belt or screw) This provides roughly 10 ft of travel which extends the length of the existing mobile conveyor. The tilting function can also be located in the joint assembly of the carriage frame again by a horizontal pivot, except that it slides on the rail instead of being fixed on the conveyor. In the preferred embodiment, the swiveling function, which allows the transfer conveyor to swing from side to side without moving the mobile conveyor, is also located in the joint assembly of the carriage frame.

The swivel preferably further supports the transfer duct for pivotal movement relative to the guide track about a laterally oriented pivot axis oriented transversely to the upright swivel axis. The swivel may comprise a universal joint which defines the upright swivel axis and the laterally oriented pivot axis.

4. The transfer apparatus may further comprise (i) an upper mounting collar supported on the transfer duct, (ii) a lower mounting collar supported on the carriage frame and adapted to be in alignment with the inlet opening of the main duct in the deployed position, and (iii) an angularly adjustable tubular member connected between the upper and lower mounting collars. The angularly adjustable tubular member may comprise a tube of flexible material.

Preferably a drive motor is supported on the carriage frame and is operatively connected to the guide track so as to drive longitudinal displacement of the carriage frame along the guide track.

A rack may be mounted to extend in the longitudinal direction alongside the guide track such that a drive gear coupled to the drive motor may be provided in meshing engagement with the rack, whereby the drive motor drives rotation of the drive gear to displace the carriage frame along the guide track as the drive gear is displaced along the rack. The guide track is preferably adapted to be supported on a top side of the main duct, for example a main duct comprising a tubular auger housing. The guide track may span only partway along the length of the main duct. The guide track may comprise a pair of laterally spaced apart rails.

An inlet hopper may be coupled to the inlet end of the transfer duct having a top opening spanning a top side of the inlet hopper, in which the inlet hopper is arranged to load material into the inlet end of the transfer duct.

The inlet hopper may be pivotal relative to the transfer duct about a hopper axis oriented in a longitudinal direction of the transfer duct.

The inlet hopper may be pivotal relative to the transfer duct through a range of at least 180 degrees between a working position in which the top opening faces upwardly, and a stored position in which the top opening faces downwardly. Preferably the carriage frame is movable into the retracted stored position with the inlet hopper in the stored position of the inlet hopper.

The transfer apparatus preferably includes extension wheels supported on the inlet hopper so as to be arranged for rolling movement along the ground in a longitudinal direction of the transfer duct as the carriage frame is displaced between the retracted stored position and the deployed position.

The transfer apparatus preferably includes swing wheels supported on the inlet hopper so as to be arranged for rolling movement along the ground in a lateral direction transversely to a longitudinal direction of the transfer duct as the transfer duct is pivotal about the upright swivel axis relative to the guide track in the deployed position of the carriage frame.

When swing wheels and extension wheels are both supported on the inlet hopper, the swing wheels may be movable relative to the extension wheels between a swing position in which the swing wheels engage the ground and the extension wheels are spaced above the ground and an extension position in which the extension wheels engaged the ground and the swing wheels are spaced above the ground.

The swing wheels may be coupled to the transfer duct such that the inlet hopper is pivotal relative to the transfer duct and the swing wheels supported thereon about a hopper axis oriented in a longitudinal direction of the transfer duct.

A swing drive motor may be operatively connected to the swing wheels to drive rotation of the swing wheels so as to drive pivotal movement of the transfer duct about the upright swivel axis relative to the guide track.

The transfer apparatus may be used in combination with a seed cart comprising the main conveyor supported thereon so as to be arranged for loading material into a seed tank on the seed cart in which the guide track is mounted on the main duct of the main conveyor and in which the transfer apparatus further comprises an inlet housing coupled to the inlet opening of the main duct, the inlet housing having a top opening spanning a top side thereof which is aligned with the discharge opening of the transfer duct in the deployed position of the carriage frame.

BRIEF DESCRIPTION OF THE DRAWINGS

Some embodiments of the invention will now be described in conjunction with the accompanying drawings in which.

In the drawings like characters of reference indicate corresponding parts in the different figures.

DETAILED DESCRIPTION

Figure 1:
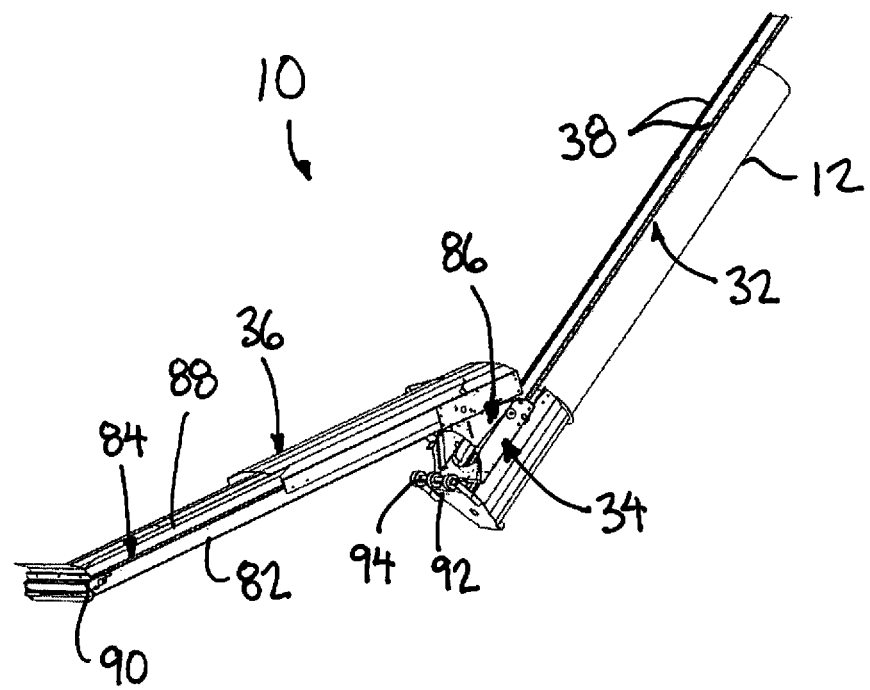
FIG. 1 is a perspective view of a first embodiment of the transfer apparatus in an extended position relative to a mobile conveyor.
Figure 2:
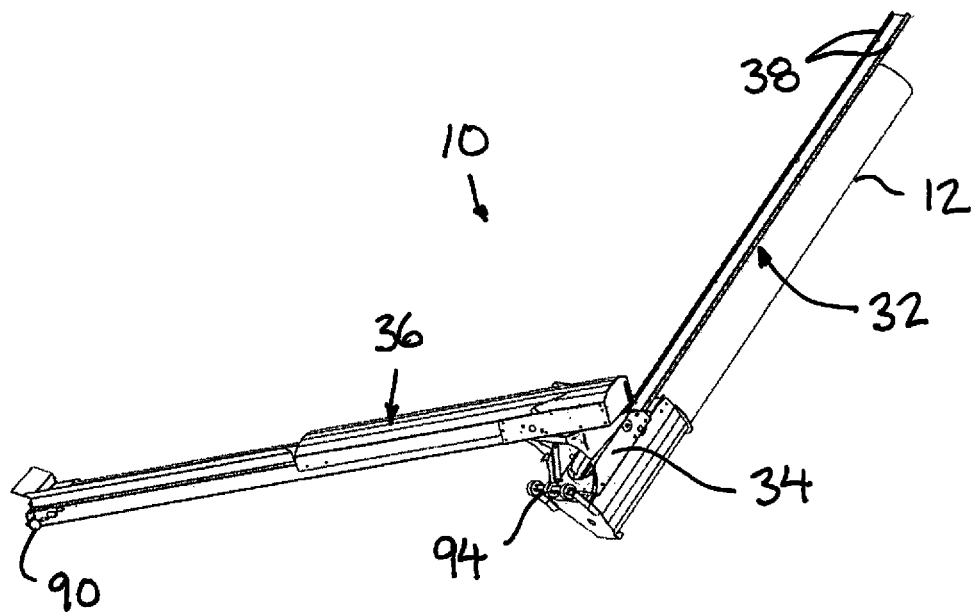
FIG. 2 is another perspective view of the transfer apparatus according to the first embodiment in an extended position relative to a mobile conveyor in which the transfer apparatus has been pivotally displaced about the upright swivel axis thereof relative to FIG. 1.

Referring to the accompanying figures, there is illustrated a transfer apparatus generally indicated by reference numeral 10. The apparatus 10 is particularly suited for use with a main conveyor 12, for example the loading conveyor on a seed cart 14 or other implement having a similar conveyor, for transferring particulate material such as seed onto the seed cart. The apparatus 10 may be retrofit onto an existing implement by replacing the conventional intake hopper of the implement. Alternatively, the apparatus 10 may be directly incorporated into the implement at the time of manufacture.

In the instance of a seed cart 14, the cart typically includes a frame 16 supported on wheels for rolling movement on the ground. A seed tank 18 is supported on the frame and includes a top hatch opening 20 which serves as the target that receives particulate material from the loading conveyor 12. The loading conveyor is supported on the frame by a support arm assembly 22 such that the main conveyor can be deployed in a loading position in which the conveyor extends at an upward slope for discharging into the hatch opening at the top end thereof.

The loading conveyor typically comprises an elongate main duct 24 illustrated in the accompanying figures as a tubular auger housing of circular cross-section. The main duct communicates from an inlet opening 26 at an inlet end of the main duct, to a discharge opening at the bottom side of the main duct adjacent to the opposing outlet end for communication with a spout 28 to direct the conveyed particulate material into the hatch opening of the seed cart.

A main conveyor member 30 is received within the main duct in the form of an auger screw which is driven to rotate about a longitudinal axis thereof in a manner to transfer or carry particulate material along the main duct from the inlet opening 26 to the spout 28 at the discharge opening.

If retrofitting an existing main duct in which an intake hopper (not shown) is mounted onto the inlet end of the main duct and which defines the inlet opening spanning the opening top side of the intake hopper, the intake hopper can be removed and replaced with an inlet housing 29. The inlet housing has duct walls which define an extension of the tubular wall of the main duct 24. The inlet housing 29 defines the inlet opening 26 of the main duct spanning the top side thereof. The main conveyor member 30 extends at least partway into the inlet housing or is provided with an extension that extends into the inlet housing 29 so that the main conveyor member 30 is arranged to convey material from the inlet opening in the inlet housing 29 to the main duct, and along the main duct to the discharge opening of the main conveyor. The inlet housing 29 may be configured to be clamped or fastened in overlapping configuration externally about an end portion of the main duct so that a portion of the main conveyor member 30 that protrudes from the inlet end of the main duct occupies the inlet housing 29 to collect material at the inlet end of the main duct.

In the instance of an implement being equipped with the transfer apparatus upon initial manufacturing, the inlet housing 29 comprises an inlet end portion which is continuous with the remainder of the main duct 24.

Although various embodiments of the transfer apparatus are shown in the accompany figures and described herein, in each instance, the transfer apparatus 10 generally includes (i) a guide track 32 that is adapted to be mounted along the top side of the main duct 24 adjacent the inlet end thereof, (ii) a carriage frame 34 which is supported on the guide track for sliding movement linearly along the guide track that is mounted along the main duct, and (iii) a transfer conveyor 36 which is carried on the carriage frame so as to be adapted to be extended and retracted relative to the main duct and so as to be pivotal relative to the carriage frame about both an upright swivel axis and a laterally oriented pivot axis for varying the angular slope of the transfer conveyor from horizontal. The transfer conveyor 36 has a transfer conveyor member movable within a transfer duct to convey material along the duct.

The guide track 32 generally comprises two parallel and spaced apart rails 38 which are formed at laterally opposing sides of an elongate base plate 40. The base plate spans the full length of the guide track and includes a pair of side flanges extending upwardly from opposing sides of the base plate. The pair of top flanges 42 extend laterally inwardly towards one another from the top ends of the side flanges so as to be parallel and spaced above the base plate 40 and so as to define the pair of rails 38 of the track.

The base plate 40 includes a base opening therein adjacent the inlet end of the main duct for alignment with the top opening in the main duct at the inlet end thereof.

The guide track further defines a rack 44 supported thereon to extend longitudinally along the length of the track up to the base opening in the base plate 40 that aligns with the inlet opening of the main duct. The rack 44 comprises a chain or similar traction element which can be fixed onto the base plate for cooperation with a suitable drive gear 46 described in further detail below. A plurality of longitudinally spaced apart recesses 48 are defined in the chain that forms the rack 44 in which the recesses receive the teeth of the drive gear in meshing relationship therein.

Figure 3:
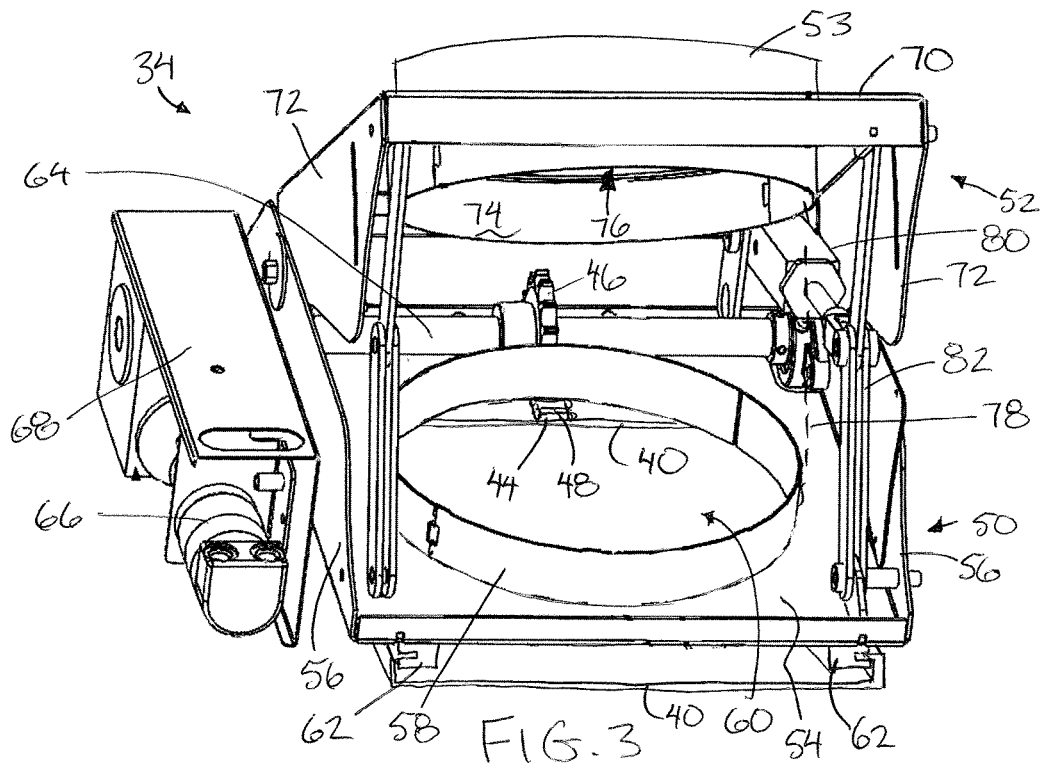
FIG. 3 is an enlarged perspective view of the carriage frame shown removed from the transfer apparatus for illustrative purposes according to the first embodiment.

Turning now more particularly to the first embodiment, the carriage frame 34 in this instance is shown in further detail in FIG. 3. More particularly the carriage frame includes (i) a lower frame portion 50 mounted for sliding movement along the guide track, (ii) an upper frame portion 52 which is supported on the lower frame portion for pivotal movement about a lateral pivot axis of the carriage frame, and (iii) a swivel 53 which couples the transfer conveyor to the upper frame portion such that the transfer conveyor is pivotal about an upright swivel axis relative to the upper frame portion of the carriage frame, which is in turn pivotal about the lateral pivot axis relative to the lower frame portion 50, which is in turn longitudinally slidable relative to the guide track upon which it is supported.

The lower frame portion 50 comprises a bottom plate 54 which extends longitudinally between a first end at the top end of the carriage frame, and a second end at the bottom end of the carriage frame which is closer to the inlet end of the main duct than the first end. The bottom plate 54 supports a pair of side plates 56 extending upwardly, so as to be parallel and spaced apart from one another, at laterally opposing sides of the bottom plate. The side plates to support the upper frame portion thereon.

The lower frame portion also includes a lower mounting collar 58 mounted centrally on the bottom plate in open communication with a lower opening 60 in the bottom plate which is aligned with and occupies the full diameter of the mounting collar 58.

Two follower elements 62 are mounted on the bottom side of the bottom plate 54 in which each following element comprises an elongate bushing block mounted for sliding engagement with a respective one of the rails of the guide track. The follower elements 62 extend in the longitudinal direction between first and second ends of the lower plate 54 such that the follower elements are laterally spaced apart by a distance which is greater than the diameter of the lower opening 60 of the lower frame portion. More particularly, each follower element includes a respective slot formed therein so that the slots are open laterally to the outer sides of the follower elements. The slots are sized appropriately for receiving the free ends of the top flanges 42 defining the pair of rails therein respectively. The follower elements are spaced apart so as to locate the carriage frame laterally in relation to the guide track while enabling the carriage frame to be readily slidable along the guide track in the longitudinal direction of the main duct.

A drive shaft 64 is rotatably supported within bearings supported at laterally opposing sides of the bottom plate such that the drive shaft 64 extend laterally between the side plates 56 of the lower frame portion adjacent to the first end thereof. The drive shaft supports the drive gear 46 in fixed relation thereon for rotation together about a longitudinal axis of the drive shaft.

A suitable drive motor 66 is supported on a respective mounting plate 68 which is mounted in fixed relation to the bottom plate 54 at a location laterally offset to one side of the bottom plate. The motor includes a rotary output coupled to the drive shaft 64 at one end thereof such that actuation of the motor causes rotation of the drive gear to displace the drive gear along the rack 44 which in turn displaces the carriage frame along the rails 38 of the guide track.

In this manner, the motor can be operated to longitudinally displace the carriage frame between a deployed position and a retracted storage position of the transfer apparatus. In the deployed position, the lower opening 60 of the lower frame portion is aligned with the top inlet opening 26 of the main duct of the main conveyor. The upper frame portion 52 comprises a top plate 70 similarly sized to the bottom plate 54 of the lower frame portion and similarly extending longitudinally between corresponding first and second ends. A pair of side plates 72 extend downwardly from laterally opposing side edges of the top plate 70 so as to be parallel and spaced apart from one another by a suitable spacing which is approximately equal to or very near to the lateral spacing between the side plates of the lower frame portion. Each side plate of the upper frame portion is pivotally coupled to a corresponding side plate of the lower frame portion so that the pivotal connections at laterally opposing sides of the carriage frame collectively define the lateral pivot axis about which the upper frame portion is pivotal relative to the lower frame portion.

The upper frame portion similarly includes a mounting collar 74 of similar diameter to the mounting collar of the lower frame portion in which an upper opening 76 in the top plate is similarly aligned with the mounting collar 74 of the upper frame portion. A flexible tube 78 (represented in broken line in FIG. 3) is coupled at opposing ends to respective ones of the mounting collars 74 and 58 of the upper and lower frame portions in which the flexibility of the tube allows for some angular adjustment between the top and bottom ends of the tube to accommodate the variation in angular orientation of the upper frame portion relative to the lower frame portion about the lateral pivot axis therebetween.

The swivel 53 comprises a swivel collar supported on the top side of the top plate 70 of the upper frame portion so as to be rotatable relative to the upper frame portion about an upright axis of the collar which is concentric with the upper opening 76 in the top plate of the upper frame portion. The swivel axis is perpendicular to the upper frame portion as defined by the swivel collar such that the angular orientation of the upright swivel axis relative to the lower frame portion and relative to the guide track upon which it is supported will vary as the upper frame portion pivots relative to the lower frame portion.

The angular orientation of the upper frame portion relative to the lower frame portion can be controlled using a suitable actuator 80 which is operatively connected between the upper and lower frame portions. More particularly a pair of foldable links 82 are provided at laterally opposing sides of the carriage frame such that each foldable link 82 is pivotally coupled at opposing ends to respective ones of the upper and lower frame portions adjacent the second ends thereof. More particularly each foldable link comprises an upper link member and a lower link member pivotally coupled together at a central location between the upper and lower frame portions.

The actuator 80 comprises a pair of hydraulic piston cylinder actuators in which a first end of each actuator is pivotally coupled to the bottom plate 54 of the lower frame portion adjacent the first end thereof while the opposing end of each actuator is pivotally coupled to the central pivot of one of the foldable links 82. In this manner linear extension and retraction of the actuators causes the upper and lower links of the respective foldable link 82 to be folded or extended relative to one another which in turn varies the spacing between the second end of the upper frame portion and the second end of the lower frame portion so as to pivot the upper frame portion relative to the lower frame portion about the lateral pivot axis adjacent the first ends of the upper and lower frame portion.

The actuators may be displacement type cylinders so they can only act in the extension direction. The links are arranged so that they do not over-center, so that a single acting cylinder will work. In further embodiments, a mechanical lift system could be used instead of a hydraulic actuator, ie when the unit is fully extended it engages a mechanical lift, but use of hydraulic actuators is easier and more compact. The transfer conveyor 36 comprises a transfer duct 82 in the form of an elongate housing of generally rectangular cross-section in the illustrated embodiment. The duct extends between a top opening 34 at the top side of the housing adjacent a first inlet end of the housing and a discharge opening 86 at the bottom side of the housing adjacent the outlet end of the housing. The transfer duct 82 is coupled at the bottom side thereof in proximity to the outlet end to the swivel collar of the swivel 53 such that the discharge opening 86 of the transfer duct is aligned with and in open communication with the upper opening 76 in the top plate of the upper frame portion of the carriage frame.

A transfer conveying member 88 is supported within the transfer duct for transferring or carrying material from the top opening at the inlet end to the discharge opening at the outlet end of the transfer duct. In the illustrated embodiment, the transfer conveyor member comprises an endless belt supported on the rollers within the transfer duct 82 such that use of a motor to drive one or more of the rollers causes the endless belt to be rotated in a manner which carries the particulate material from the inlet end to the outlet end of the transfer duct.

Figure 4:
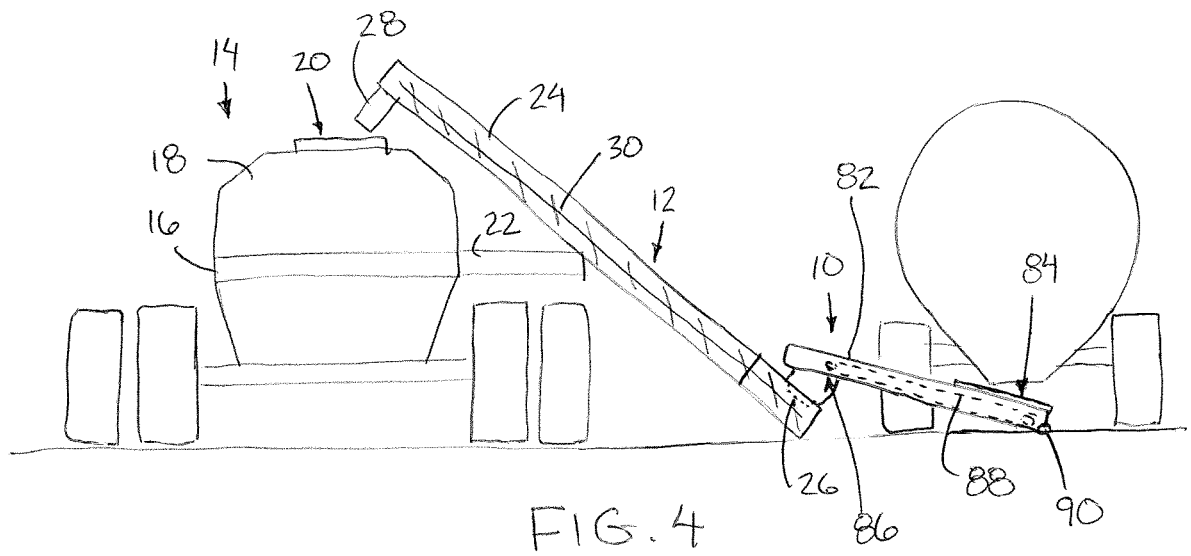
FIG. 4 is a schematic representation of the transfer apparatus according to the first embodiment in operation between a supply discharge from a transport vehicle and the mobile loading conveyor of a seed cart for loading particulate material into the seed cart.

The top opening 84 may be configured to span substantially the full width of the transfer duct 82 in the lateral direction and to span nearly half the overall length of the transfer duct in the longitudinal direction so as to define a large open area which is well suited for receiving a flow of particulate material being discharged from a suitable supply such as a transport trailer having a mobile container thereon which discharges through a bottom hopper discharge as shown in FIG. 4.

The particulate material that is discharged into the transfer conveyor is conveyed by the transfer conveying member 88 along the length of the transfer duct 82. The end of the transfer conveying member is in proximity to the discharge opening such that particulate material conveyed over the end of the transfer conveying member is discharged through the discharge opening 86 of the transfer conveyor which in turn results in the particulate material being communicated through the flexible tube 88 of the carriage frame from the top side of the bottom side thereof. In the deployed position, the bottom of the flexible tube 78 of the carriage frame is aligned with the top inlet opening of the main duct so that the particulate material is then communicated into the main duct for being carried by the main duct along the length of the main duct to the spout 28 which then discharges the particulate material to the target location, such as the hatch opening of the tank of a seed cart.

The transfer apparatus 10 further includes a set of extension wheels 90 supported at the bottom side of the transfer duct adjacent the inlet end thereof so as to be arranged for rolling movement along the ground, typically in a longitudinal direction of the transfer conveyor.

The transfer apparatus also includes a support frame 92 which is mounted on the inlet end of the main duct to protrude upwardly above a top side of the main duct for supporting a set of support rollers 94 thereon. The support rollers 94 are adapted to engage the bottom of the transfer duct for rolling movement along the transfer duct as the transfer duct is longitudinally displaced from the retracted stored position towards the deployed position.

Figure 5:
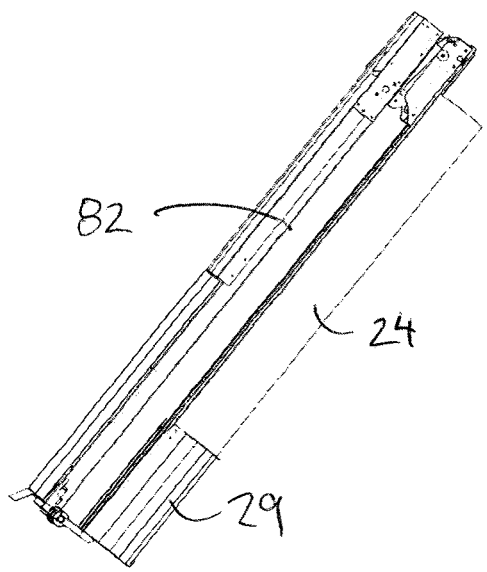
FIG. 5 is a side elevational view of the transfer apparatus according to the first embodiment in the retracted stored position.
Figure 6:
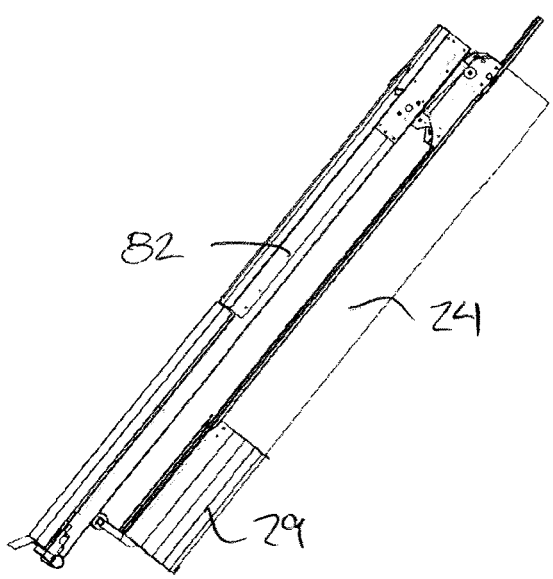
FIG. 6 is a side elevational view of the transfer apparatus according to the first embodiment in which the transfer apparatus has been initially displaced away from the retracted stored position.

The transfer duct typically spans the length of the rails of the guide track and vice versa. In a fully retracted position as shown in FIG. 5, the transfer duct lies parallel to and alongside the guide track which is in turn parallel to and alongside the main duct. More particularly, the outlet end of the transfer duct is spaced upwardly in relation to the inlet end of the main duct such that the inlet end of the main duct and the inlet end of the transfer duct are adjacent one another with the inlet end of the transfer duct being supported at the bottom side thereof on the support rollers 94. Actuation of the drive motor 66 to cause initial displacement of the transfer duct from the retracted stored position towards the deployed position as shown in FIG. 6, results in the transfer duct being longitudinally displaced relative to the main duct by sliding movement of the carriage frame along the rails and by rolling movement of the bottom of the transfer duct on the support rollers 94.

Continued extension of the transfer duct relative to the main duct will result in the bottom rollers 90 at the bottom of the transfer duct engaging the ground if the inlet end of the main duct is engaged upon the ground.

Once the bottom rollers 90 engage the ground, continued movement of the carriage frame from the retracted position towards the extended position causes the bottom rollers to roll along the ground. The actuator 80 of the carriage frame which controls angular orientation between the upper and lower frame portions is maintained in a passive state to allow the upper frame portion to freely pivot relative to the lower frame portion so that the angular orientation of the upper frame portion relative to the lower frame portion readily varies as the bottom rollers roll along the ground and the outlet end of the transfer duct continues to vary in elevation as the carriage frame slides downwardly along the guide rails on the main duct.

Figure 7:
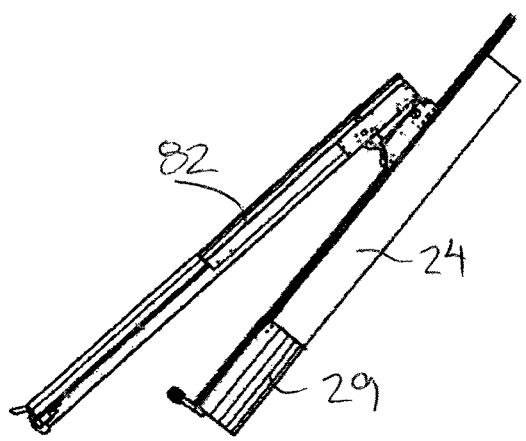
FIGS. 7 and 8 are side elevational views of the transfer apparatus according to the first embodiment in respective partially extended, intermediate positions between the retracted stored position and the extended position in which the transfer apparatus is longitudinally displaced and angular pivoted upwardly about the lateral axis of the carriage frame relative to the retracted stored position.
Figure 8:
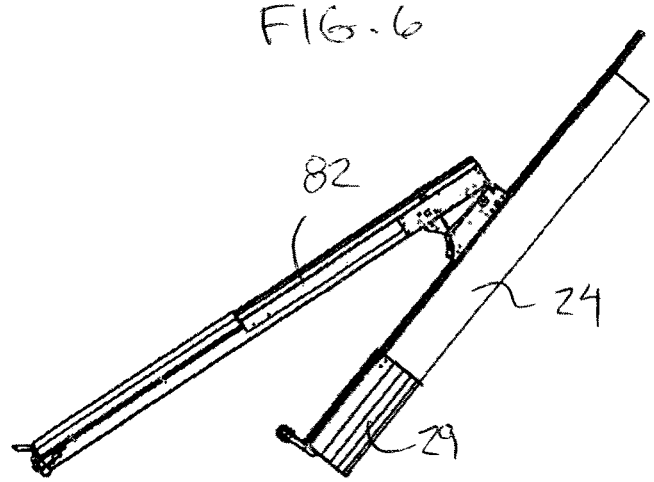
Figure 9:
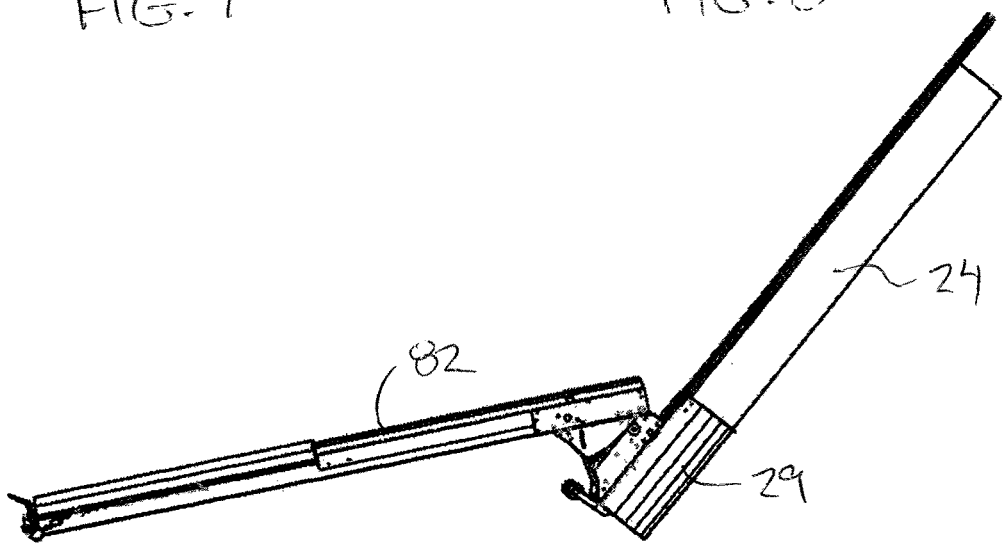
FIG. 9 is a side elevational view of the transfer apparatus according to the first embodiment in the fully extended position.
Figure 10:
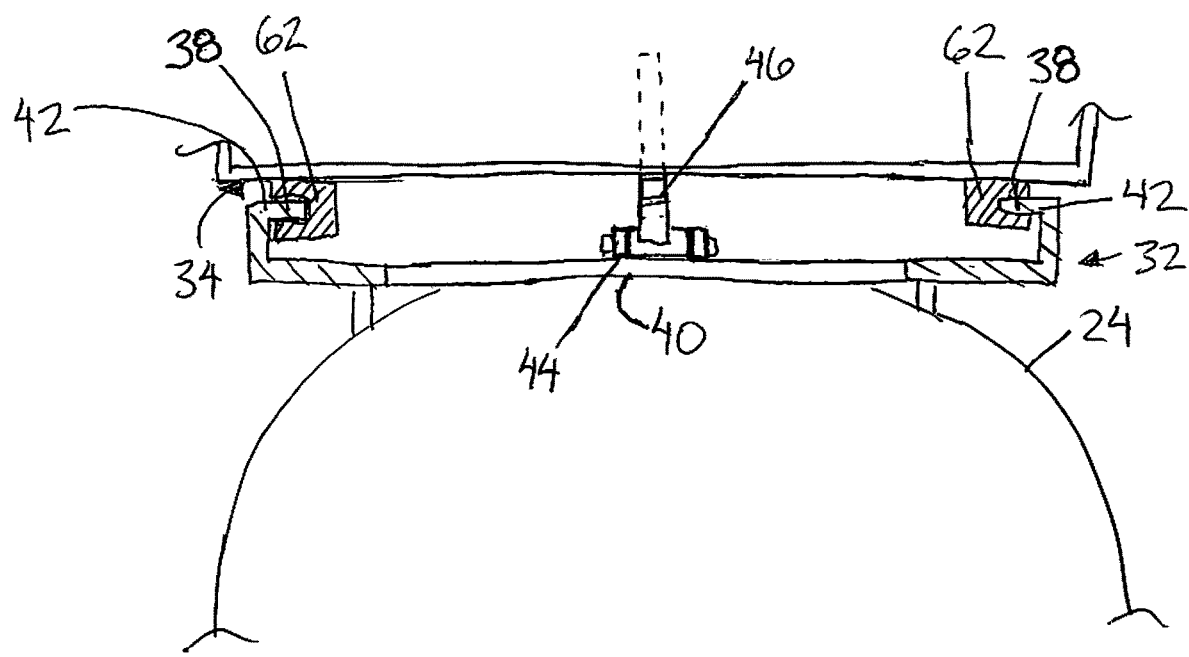
FIG. 10 is a sectional view of the transfer apparatus according to the first embodiment at the transfer opening between the transfer duct and the main duct.

In the fully retracted position, with the transfer duct approximately parallel to and alongside the main duct, the upright swivel axis of the swivel 53 is oriented perpendicularly to the longitudinal axis of the main duct, however, as the angular orientation of the upper frame portion and the transfer duct supported thereon varies relative to the lower frame portion as shown in FIGS. 7 and 8, the angular orientation of the upright swivel axis relative to the longitudinal axis of the main duct will also vary.

Once the transfer apparatus has been fully extended into the deployed position, the bottom opening in the lower frame portion of the carriage frame will be aligned with the top inlet opening of the main duct so that the outlet of the transfer duct is in open communication through the flexible tube 78 with the inlet of the main duct.

If it is desired to pivot the transfer duct about the upright swivel axis relative to the main duct to laterally displaced the inlet opening thereof relative to the main duct, the operator can manually displace the transfer duct by initially actuating the actuator 80 of the carriage frame to pivot the upper frame portion relative to the lower frame portion sufficiently that the inlet end of the transfer duct is lifted off of the ground. As the swivel axis assumes a more upright orientation, it is easier for the operator to manually swivel the transfer duct about the upright swivel axis to the desired position. The actuator 80 can then be actuated again in the opposing direction to return the inlet end of the transfer duct into engagement upon the ground at the new location of the inlet end of the transfer duct. The operator can then resume discharge of material from a supply truck into the inlet end of the transfer apparatus for continued conveyance of the particulate material through the transfer apparatus into the main duct of the main conveyor.

In further embodiments, the bottom rollers 90 may comprise powered wheels which can be oriented in a lateral direction to assist in swiveling of the transfer duct relative to the main duct about the upright axis while remaining engaged upon the ground.

In other embodiments, the transfer apparatus may be used with different types of main conveyors associated with different implement types, including belt conveyors for example.

In other embodiments, the transfer apparatus itself may be an auger conveyor instead of a belt conveyor to transfer material from the inlet end to the outlet end thereof.

Figure 11:
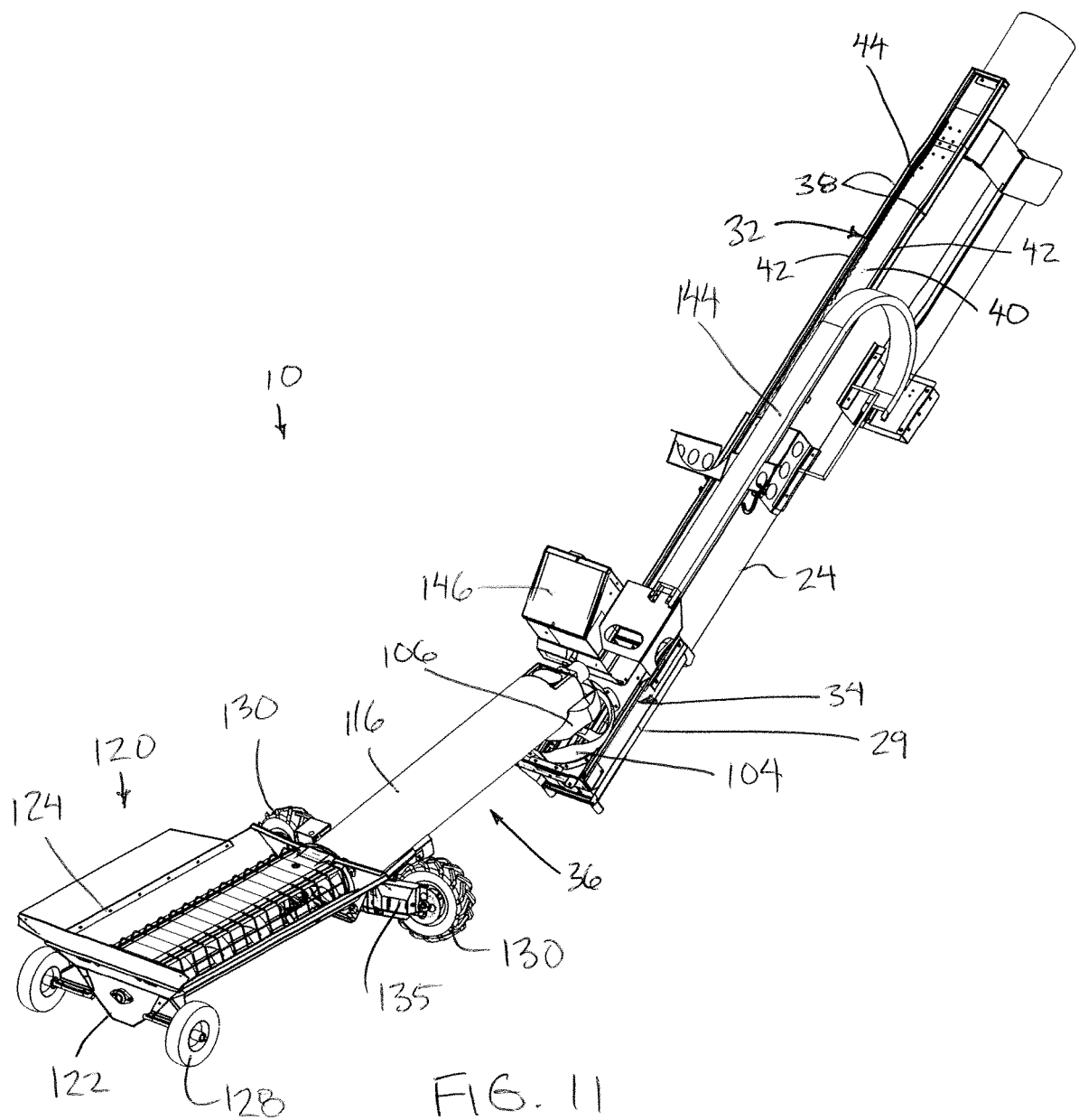
FIG. 11 is a perspective view of the transfer apparatus according to a second embodiment, in the extended position.
Figure 12:
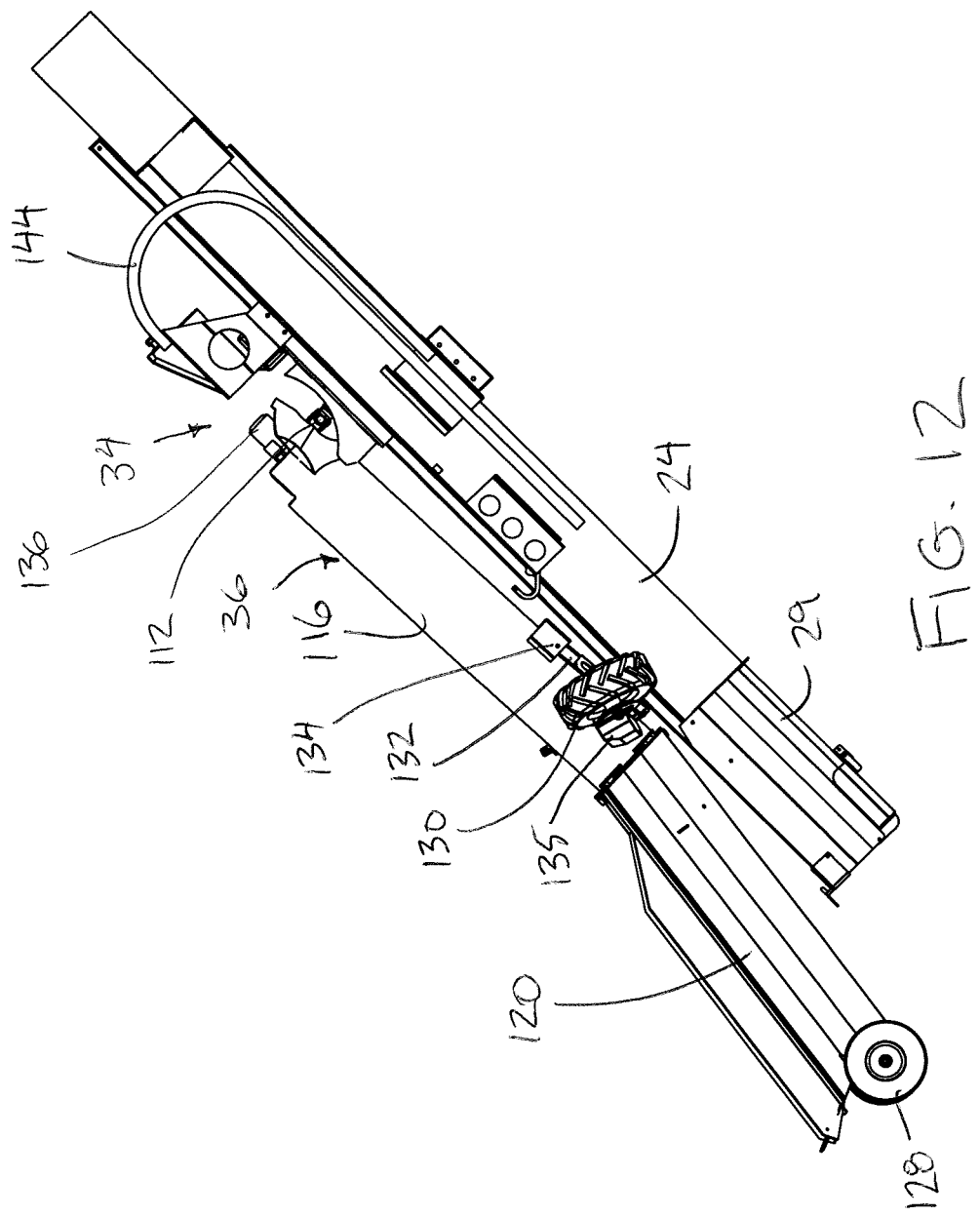
FIG. 12 is a side view of the transfer apparatus according to the second embodiment in the retracted position.
Figure 13:
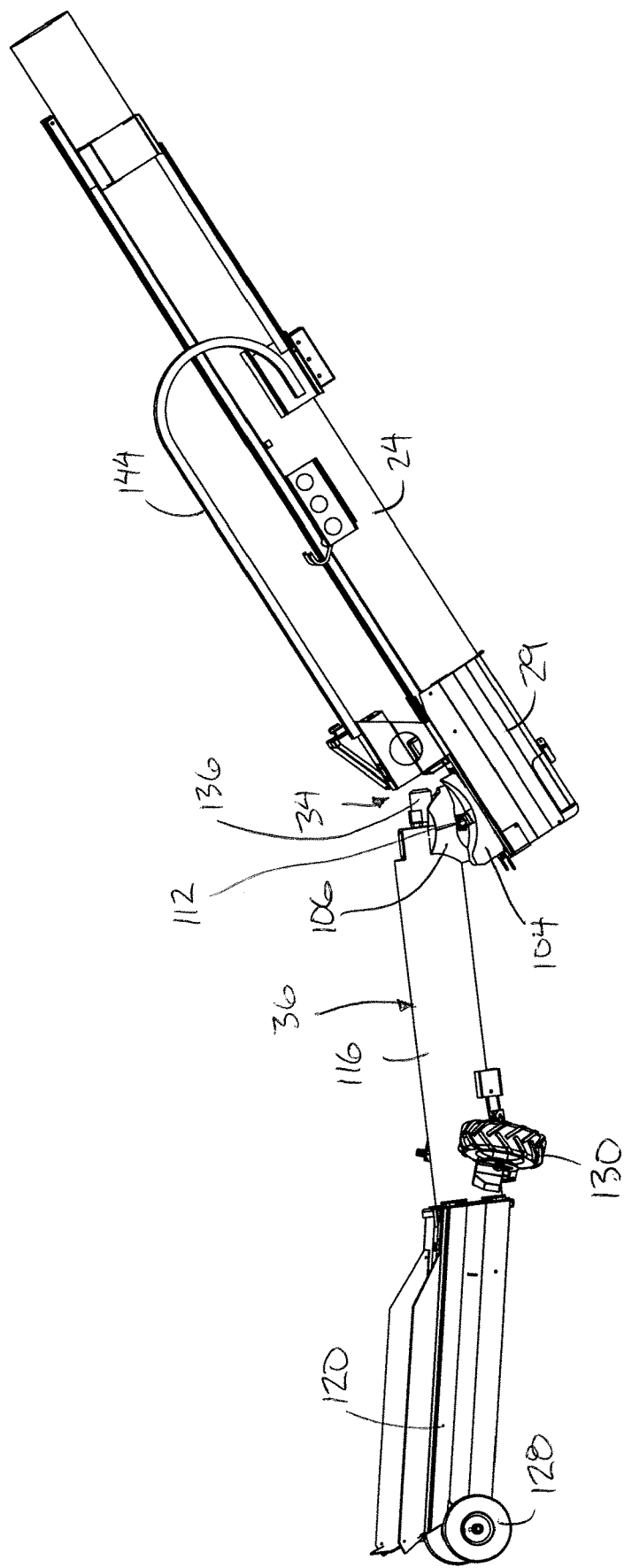
FIG. 13 is a side view of the transfer apparatus according to the second embodiment in the extended position.
Figure 14:
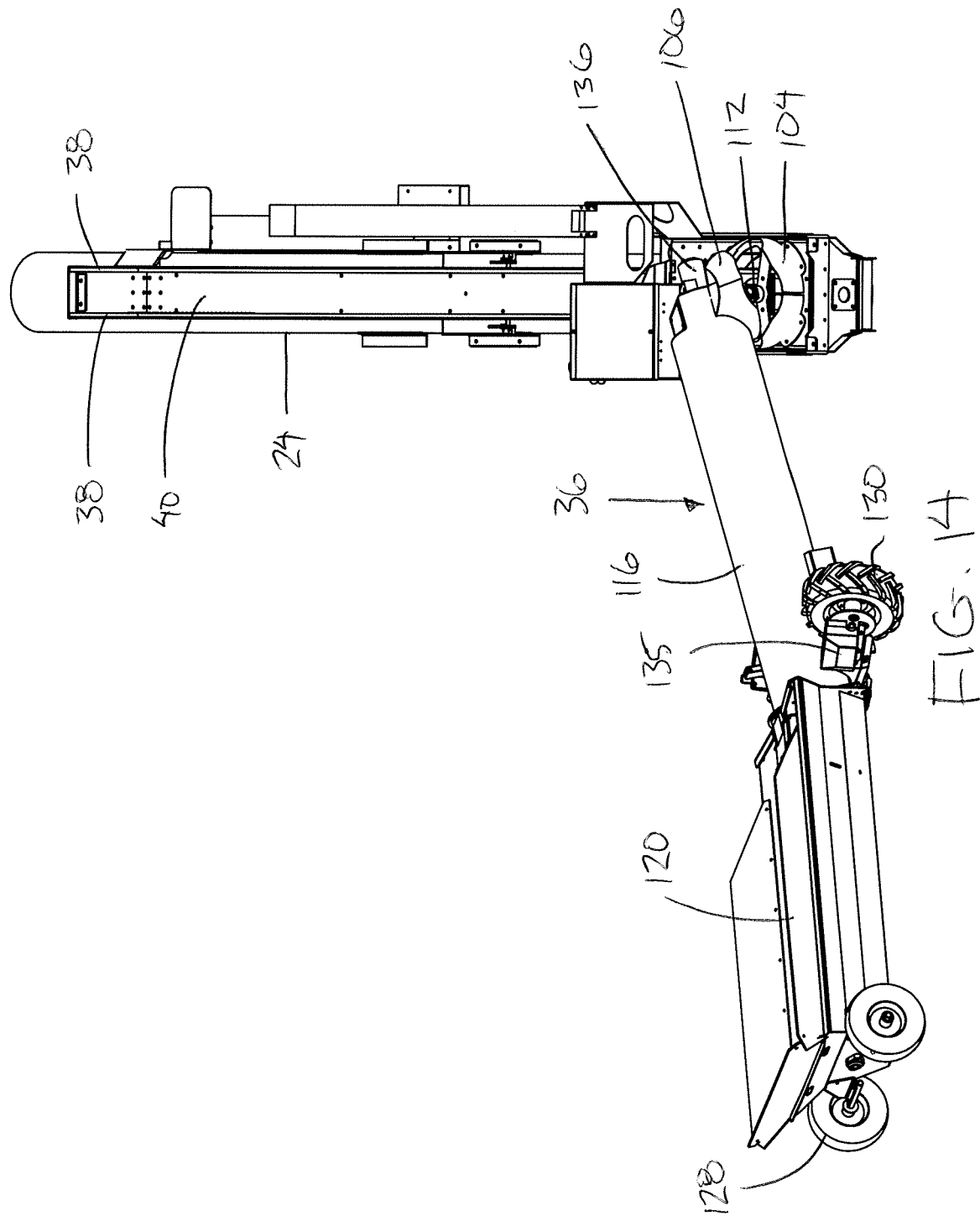
FIG. 14 is an end elevational view of the transfer apparatus according to the second embodiment in the extended position in which the transfer duct is further pivoted about the upright swing axis.

Turning now to a second embodiment of the transfer apparatus as shown in FIG. 11, the carriage frame in this instance comprises a lower plate 100 which is supported for sliding movement along the rails 38 of the guide track. The lower plate is sized to span the full width and the full-length of the open top side of the inlet housing 29 in the deployed position of the carriage frame at the inlet end of the main duct. In this manner the lower plate of the carriage frame encloses the inlet housing in the deployed position of the transfer duct. A transfer opening 102 is provided in the lower plate 100 towards the inlet and of the main duct so as to be in alignment in the flow path between the discharge end of the transfer duct and the top opening of the inlet housing 29 to receive conveyed material transferred therethrough.

The carriage frame further comprises a lower mounting collar 104 extending upward from the lower plate 100 about the transfer opening 102. A cooperating upper mounting collar 106 is mounted at the bottom side of the transfer duct at the discharge end thereof to surround the discharge opening of the transfer duct. A gap is provided between the lower mounting collar 104 and the upper mounting collar 106 so that a flexible tube (not shown) can be supported to communicate between the upper and lower mounting collars while enabling the upper mounting collar 106 on the transfer duct to be angularly adjustable relative to the lower mounting collar on the carriage frame about the upright swivel axis and the lateral pivot axis noted above. The flexible tube is a round duct of flexible material having a diameter approximately equal to the diameters of both the upper and lower mounting collars. In one embodiment the flexible tube is sized to match the upper mounting collar and is fixed to the upper mounting collar to rotate relative to the lower mounting collar. The lower mounting collar in this instance has an inner diameter which is greater than the outer diameter of the flexible tube so as to receive the flexible tube therein to allow material discharged from the transfer duct to be fully received within the inlet opening of the main duct while enabling free rotation of the upper mounting collar relative to the lower mounting collar.

In order to support the transfer duct relative to the carriage frame, a lower support plate 110 is provided as a crossbar spanning across the transfer opening 102 in the lower plate. A swivel assembly 112 is mounted on the lower support plate 110 for connection between the lower support plate and a corresponding upper support plate 114 which is fixed onto the transfer duct to extend partway across the discharge opening at the discharge end of the transfer duct. The swivel assembly 112 includes a bearing joint that enables relative pivotal movement about the upright swivel axis, and a universal joint which allows pivot movement about a lateral pivot axis which is pivotal relative to the main duct together with the bearing joint about the upright axis. In this manner the transfer duct is coupled at the discharge end thereof relative to the carriage frame so as to be freely pivotal about the upright swivel axis and the transverse lateral pivot axis to locate the inlet end of the transfer duct through a large range of positions relative to the main duct.

The transfer conveyor 36 in this instance comprises a transfer duct 116 in the form of a tubular housing of circular cross-section. The transfer conveyor member 118 in this instance is an auger that is rotatable within the tubular transfer duct to convey the material along the transfer duct from the inlet end to the discharge opening thereof.

The transfer duct 116 in this instance is coupled to an inlet hopper 120 which locates the inlet opening of the transfer duct therein. The inlet hopper 120 comprises a trough having a lower portion 122 which is semicircular in profile having a diameter which is similar to the diameter of the transfer duct, and an upper portion 124 comprised of two opposing side walls which diverge upwardly and away from one another to the open top side of the hopper which is wider than the diameter of the transfer duct. The inlet opening at the top side of the inlet hopper 120 is generally rectangular in shape and spans the full width and full length of the hopper.

The inlet hopper is coupled to the inlet end of the transfer duct so as to be pivotal relative to the transfer duct about a longitudinal axis of the transfer duct. A longitudinal axis of the lower portion of the trough is parallel to a plane of the top opening of the inlet hopper. Both the longitudinal axis of the trough and the plane of the top opening are angularly offset relative to the longitudinal axis of the duct such that an interior angle between the top opening of the inlet hopper and the transfer duct is less than 180°.

In this instance the inlet hopper can be pivoted from a working position in which the top opening of the inlet hopper faces upwardly and the inlet hopper is oriented at a first slope from horizontal, and a stored position in which the top opening of the inlet hopper faces downwardly and the hopper is oriented at a steeper slope from horizontal as compared to the working position. When the inlet hopper is pivoted into the stored position, the carriage frame can be retracted into the transport position thereof in which the inlet housing 29 at the inlet end of the main duct is partially nested into the top opening of the inlet hopper 120. Optionally, locking tabs 126 may be provided on the inlet end of the inlet housing 29 to protrude longitudinally outward therefrom to be received within respective slots in a corresponding end wall of the inlet hopper in the transport position. A suitable locking pin can be inserted through the locking tab protruding through the slot in the end wall of the inlet hopper to effectively retain the transfer duct in the transport position. The inverted orientation of the inlet hopper prevents entry of precipitation and the like into the inlet hopper during storage.

Two extension wheels 128 are mounted at the inlet end of the inlet hopper 120 opposite from the transfer duct so as to be rotatable about a common lateral axis. The extension wheels 128 are supported at laterally opposing sides of the inlet hopper. The extension wheels 128 are supported at the bottom side of the inlet hopper so as to be arranged for engaging the ground for supporting the inlet hopper for rolling movement along the ground in a longitudinal direction of the transfer duct as the carriage frame is displaced along the main duct between the retracted and deployed positions thereof.

Two swing wheels 130 are further provided at the inlet end of the transfer duct such that pivotal movement of the inlet hopper relative to the transfer duct also pivots the inlet hopper relative to the swing wheels 130. The swing wheels are supported below the inlet end of the transfer duct on a swing frame 132. The swing frame is pivotally coupled to the bottom side of the transfer duct at an inner end 134 thereof and extends longitudinally outward towards the inlet hopper to an outer end of the swing frame supporting the swing wheels 130 thereon. The swing wheels are oriented for rolling movement in a common lateral direction which is substantially perpendicular to the longitudinal direction of the transfer duct. The swing frame pivots relative to the transfer duct about a lateral pivot axis such that the height of the swing wheels relative to the transfer duct and relative to the hopper can be varied to raise and lower the swing wheels relative to the inlet hopper and the extension wheels 128 on the inlet hopper.

A swing drive motor 135 is operatively connected to each swing wheel 130. The swing drive motors 135 are supported on the swing frame and are operable to drive rotation of the swing wheels which in turn drives pivoting movement of the transfer duct relative to the main duct about the upright swivel axis.

More particularly the swing wheels are movable from an extension position to a swing position. In the extension position, the elevation of the swing wheels is raised so that only the extension wheels engage the ground and the swing wheels are spaced above the ground so that the inlet hopper is supported for longitudinal rolling movement. In the swing position, the elevation of the swing wheels is lowered so that only the swing wheels engage the ground and the extension wheels are spaced above the ground so that the inlet hopper is supported for lateral rolling movement as the transfer duct pivots about the upright axis of the swivel assembly 112.

The transfer conveyor member 118 in this instance includes a main portion spanning the length of the transfer duct 116 and protruding partway into the inlet hopper 120, and an end portion spanning substantially the full length of the lower trough portion 122 of the inlet hopper 120. The end portion is angularly offset from the main portion by the same angle that the inlet hopper is offset from the transfer duct so that a suitable universal joint is provided at the junction between the main and end portions of the transfer conveyor member 118. A shaft of the main portion of the transfer conveyor member protrudes through the end wall of the transfer duct at the discharge end thereof for connection to a transfer drive motor 136 supported externally on the discharge end of the transfer duct for driving rotation of the transfer conveyor member relative to the transfer duct.

Figure 15:
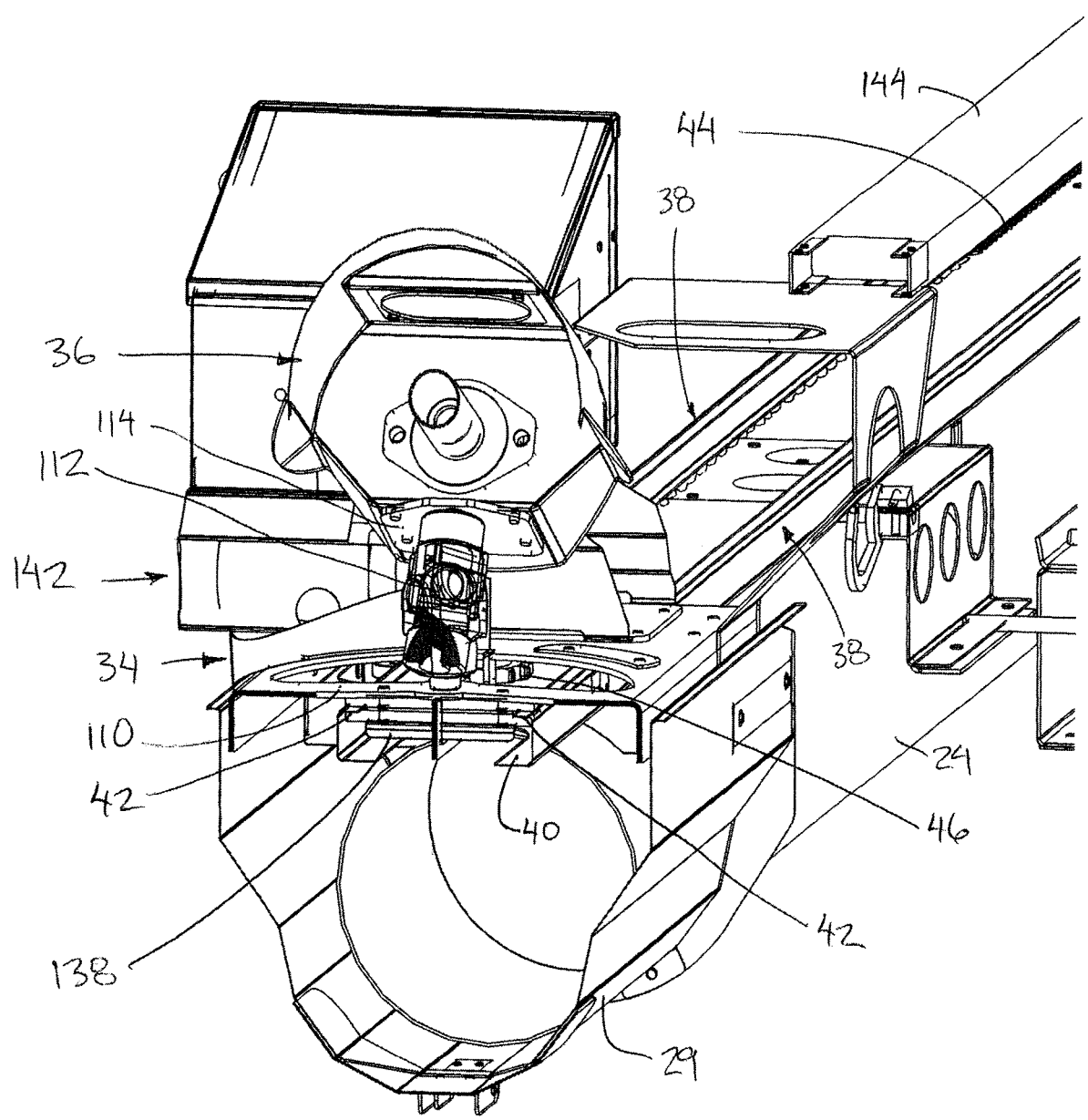
FIG. 15 is a sectional view of the inlet housing and swivel assembly in the deployed position of the transfer apparatus according to the second embodiment.
Figure 16:
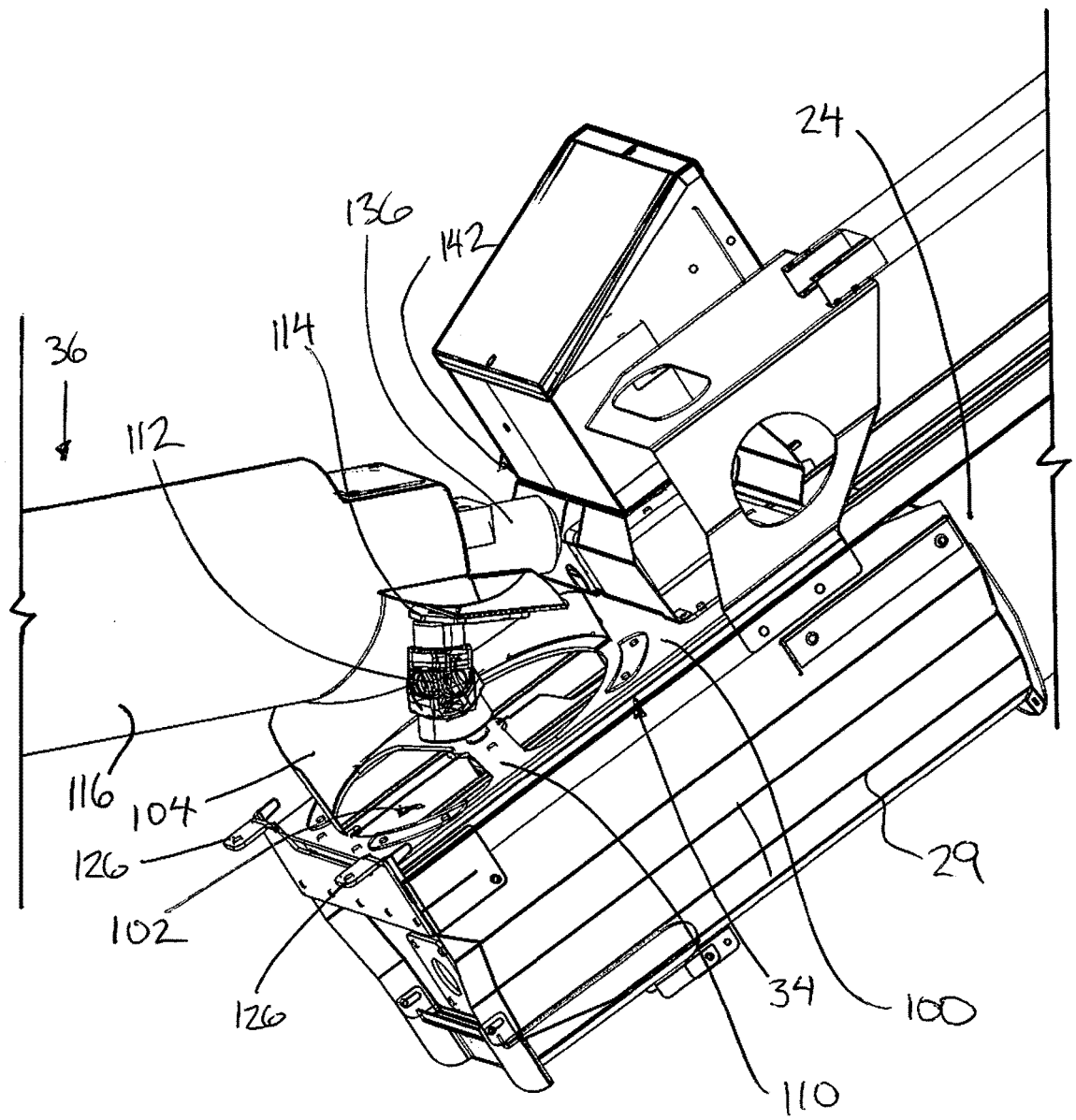
FIG. 16 is an enlarged perspective view of the swivel assembly in the deployed position of the transfer apparatus according to the second embodiment.
Figure 17:
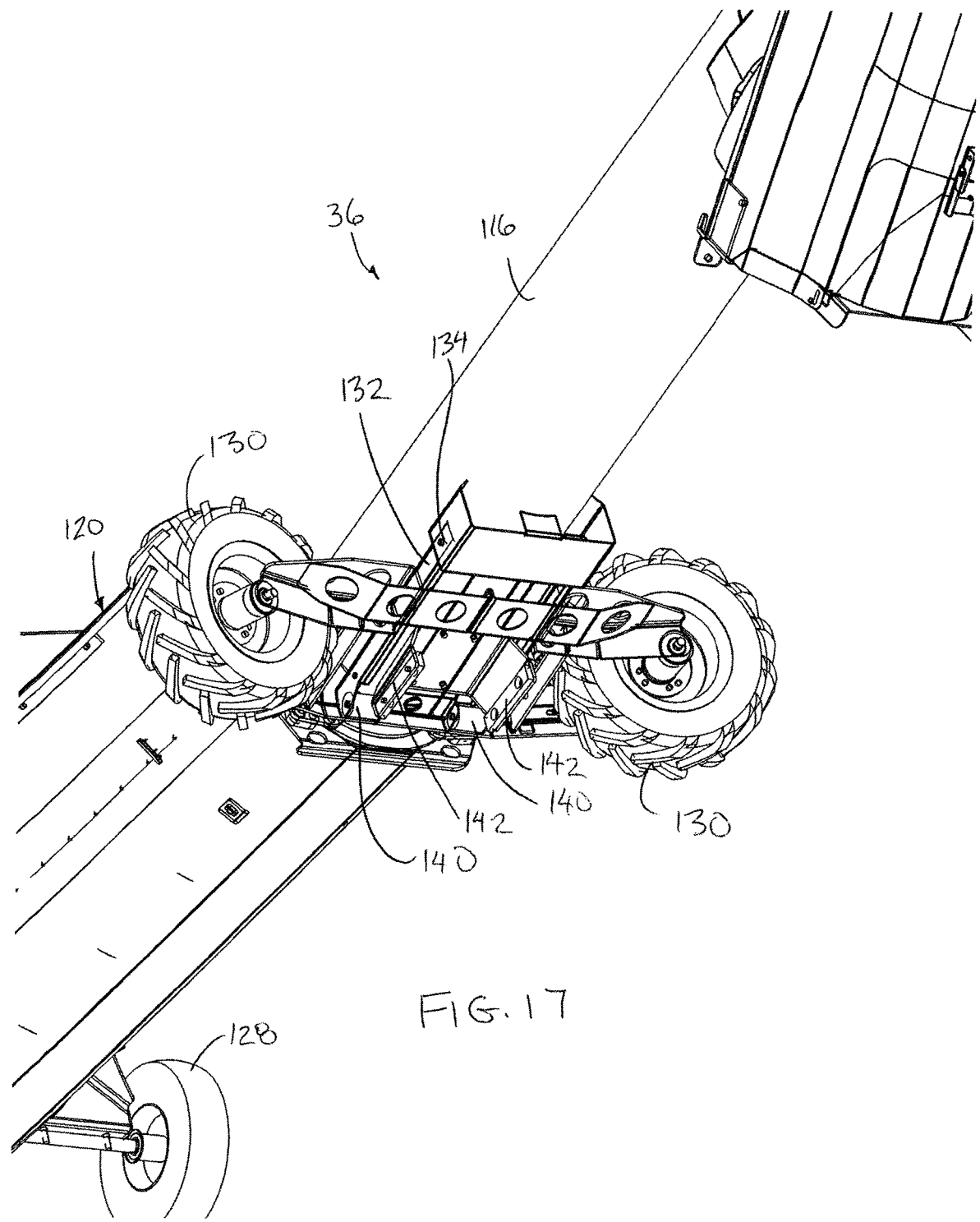
FIG. 17 is a perspective view of a bottom side of the transfer duct showing the swing wheels of the transfer apparatus according to the second embodiment.
Figure 18:
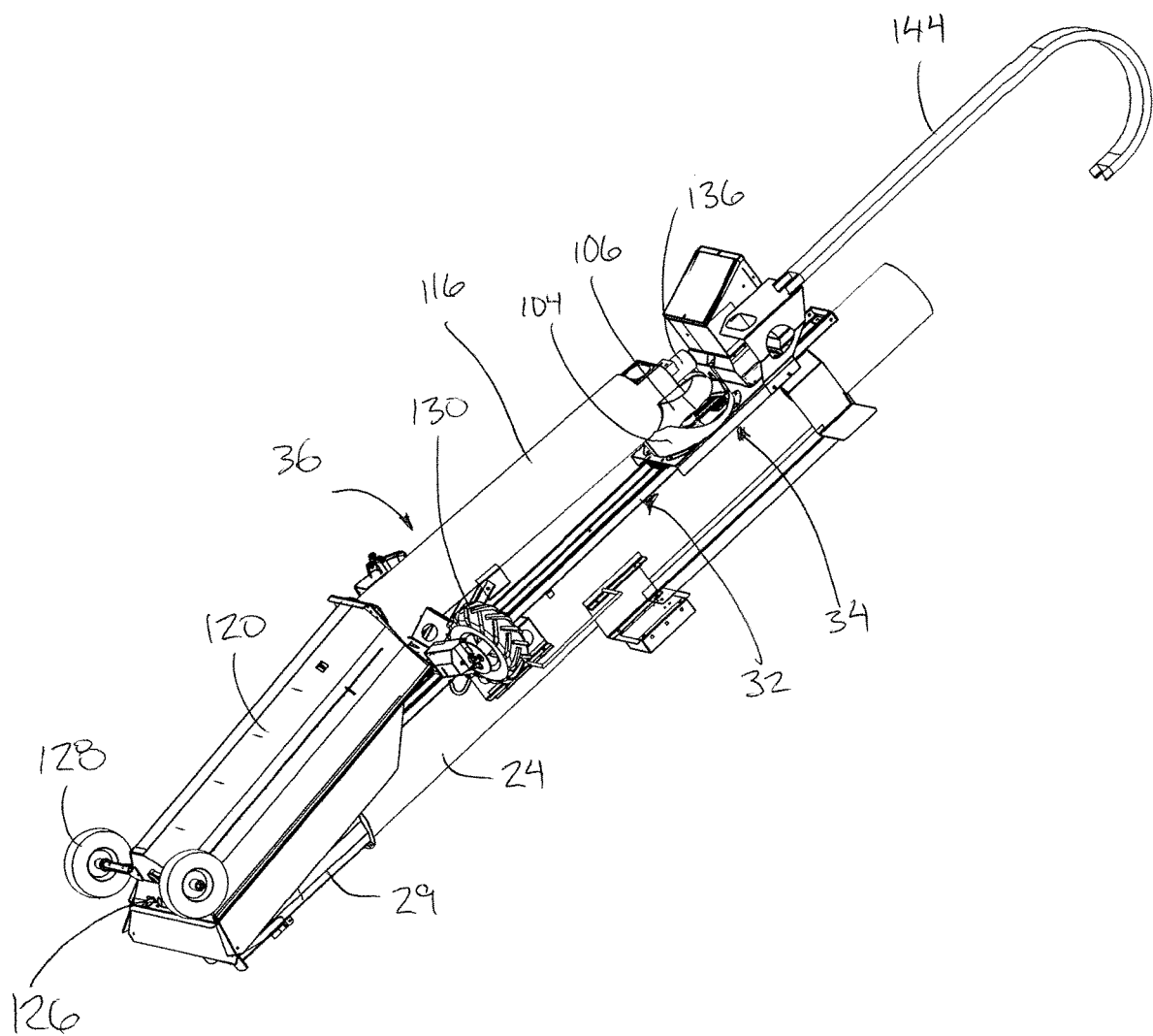
FIG. 18 is a perspective view of transfer apparatus according to the second embodiment in the retracted position, with the inlet hopper shown inverted into the stored position thereof.

To support the carriage frame for sliding movement along the rails of the guide track, followers 138 are mounted on the bottom side of the lower plate at longitudinally spaced positions. The followers are defined by bushing blocks having slots at laterally opposing sides thereof which receive the side flanges 42 of the opposing rails 38 therein. One of the bushing blocks defining one pair of opposed followers 138 is illustrated in FIG. 15 as being mounted below the lower support plate 110 spanning across the transfer opening in the lower plate. As further shown in FIG. 15, the rails are spaced apart by a lateral distance which is less than the width of the transfer opening and of the inlet housing 29. In this instance, the base opening in the base plate 42 between the rails 38 that aligns with the transfer opening in the deployed position of the transfer duct receives some of the conveyed material therethrough, however material is also free to flow around the rails at laterally outer sides of each of the rails where the transfer opening in the top opening of the inlet housing 29 extends laterally outwardly beyond the rails.

To provide further support to the transfer duct as the carriage frame is displaced between the deployed and retracted positions thereof, a set of support rollers 140 are supported on the bottom side of the transfer duct at the inlet end thereof adjacent to the pivotal connection to the inlet hopper. The rollers are supported for rolling movement about a common lateral axis which is perpendicular to the longitudinal direction of the transfer duct. The rollers are further provided at the bottom side of the transfer duct so as to be spaced apart for suitable alignment with respective ones of the two rails 38 such that the rollers roll along the top side of the rails to support the inlet end of the transfer duct relative to the main duct as the carriage frame is displaced between the deployed and retracted positions thereof.

To provide lateral support between the inlet end of the transfer duct and the main duct as the carriage frame is displaced longitudinally between the deployed and retracted positions thereof, a pair of guide plates 142 extend downward from the bottom side of the transfer duct in proximity to each of the rollers 140. Each guide plate 142 supports a bushing member comprised of a material having a low coefficient of friction which is arranged for sliding engagement along the outer side of a respective one of the rails 38.

The drive gear 46 which meshes with the rack 48 of the guide track in this instance is supported below the lower plate 100 at a location spaced towards the discharge end of the main duct relative to the transfer opening in the lower plate. The drive gear is supported for rotation on a vertical shaft (not shown) which extends upwardly through a corresponding opening in the lower plate 100 for connection to a carriage drive motor 142 supported on top of the plate of the carriage frame for movement together with the carriage frame relative to the main duct.

A cable management assembly 144 is provided in the form of a flexible U-shaped frame for supporting electrical supply lines, or hydraulic hoses communicating between a main electrical supply or a main hydraulic system of the implement and the various motors. The swing drive motor, the transfer drive motor, and the carriage drive motor may comprise electric motors or rotary hydraulic motors.

A suitable control panel 146 can be supported on the carriage frame which provides operator controls to enable an operator to control operation of some or all of the motors noted above for controlling displacement of the inlet hopper relative to a source of material being discharged, such as the discharge hopper at the bottom of a transport vehicle. Alternatively, a remote controller may be provided which communicates with the various motors through a controller on the apparatus to accept operator commands and control the motors as instructed.

As described herein, this invention is comprised of a small conveyor with an intake hopper. This conveyor is attached to a sliding collector with a spherical joint or universal joint which allows movement in all directions about the center of the discharge opening. This sliding collector is attached to a rail with sliding joints. The rail contains a rack, and the sliding collector contains the pinion and motor to drive it. The sliding collector can also be moved with a chain or cable having the motor affixed to the rail. The rail is integral with the fixed collector. The rail and fixed collector are fastened to the host conveyor which is mounted on a cart with a container for seed which is towed along with a seeder to feed seed into the seeder.

Sometimes these host conveyors are fastened to the cart with powered arms, but sometimes they are arms that are moved by hand.

When the host conveyor is folded out from the cart and the end is set on the ground, the invention then extends out from the host conveyor to allow seed or other matter to be unloaded from a hopper bottom trailer. The device only works in the extended position as the material needs to flow into the hopper, through the transfer conveyor, through the Sliding Collector into the Fixed Collector and into the host conveyor. When the device is in the extended position the mover wheels can lower and rotate to move the transfer conveyor side to side to unload from multiple hoppers.

In this embodiment the Fixed collector replaces the hopper that was attached to the host auger and then the rail was also attached to the host auger. A carrier for holding the hoses and wires is fastened by one end to the host auger and the other end to the sliding collector. The sliding collector contains a control system to move the sliding collector along the rail with the pinion motor, a battery so that the wires feeding the system only have to charge the battery. All high current draws are local to the transfer conveyor. There is also a control for the mover wheels so that the conveyor can swing side to side after lowering the wheels to lift the hopper. In this embodiment these are all electric control with local switches and wireless remote control. The mover wheels are attached to the tube of the transfer conveyor so that they can lift the tube with an actuator but they do not allow the tube to rotate axially relative to the ground. The joint connecting the transfer conveyor to the sliding collector must allow rotation of the tube axially relative to the host conveyor.

The hopper does rotate axially about the tube, but it does not do this by itself when the wheels are lowered. So the hopper stays flat to the ground allowing it to fit under the hoppers on the trailer without catching. Once the hopper is in position under a trailer the host auger is started which also starts the transfer conveyor. Once the cart is full the transfer conveyor can be retracted back up onto the host conveyor and transported in a piggy back fashion. The hopper can either latch to the rail for transport in the upright position or in the upside down position which is convenient for keeping the hopper clean and dry. There is a guide on the bottom of the mover that rides on the rail to keep the transfer conveyor on top of the host conveyor.

The reason that the loading augers on many air seeder carts are not well suited for hopper bottom trailers is that the auger can only be the length of the cart when in transport. If it is longer it will not fit when driving around the field. Because the carts are quite tall this means that the geometry of a short conveyor on a tall cart will result in a steep angle. Unless the hopper folds out, slides out or flips down or is very long it cannot reach under a hopper bottom trailer. As air carts get larger, the problem decreases as a longer conveyor on the same height cart will reach under a trailer more easily.

The apparatus of the present invention is made to adapt to existing host augers on existing carts; however, the apparatus can also be incorporated into a new cart.

Installation of the apparatus uses a kit that will bolt on to the host auger. The kit includes (i) a new fixed collector which bolts on in place of hopper that was on the host auger; (ii) a guide track of rails; (iii) rail mounting brackets to mount the rail on the host auger; (iv) a lower switch pod and bracket to the bottom of the hose carrier; (v) the transfer conveyor assembly; (vi) hoses and fittings to hook the conveyor drive motor to the host conveyor drive motor; (vii) wire to hook into power to charge the onboard battery.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A transfer apparatus for use with a main conveyor that conveys particulate material from a supply discharge to a target location, in which the main conveyor includes a main duct having an inlet opening at an inlet end of the main duct to receive the particulate material into the main conveyor and a discharge opening at an opposing outlet end of the main duct to discharge the particulate material to the target location and a main conveying member operable within the main duct to carry the particulate material along the main duct from the inlet opening to the discharge opening, the transfer apparatus comprising:
  a guide track adapted to be mounted to extend in a longitudinal direction of the guide track along the main duct from a first end of the guide track in proximity to the inlet end of the main duct to an opposing second end of the guide track which is spaced along the main duct towards the outlet end of the main duct in relation to the first end of the guide track;
  a carriage frame operatively connected to the guide track so as to be movable along the guide track between a retracted stored position and a deployed position;
  a transfer conveyor including a transfer duct and a transfer conveying member received within the transfer duct;
  the transfer duct extending between an inlet opening at an inlet end of the transfer duct adapted to receive the supply discharge and a discharge opening at an outlet end opposite the inlet end;
  the transfer conveying member being operable within the transfer duct to carry the particulate material along the transfer duct from the inlet opening to the discharge opening of the transfer duct;
  the transfer duct being supported on the carriage frame so as to be movable with the carriage frame between the retracted stored position and the deployed position;
  in the deployed position, the transfer duct extending outwardly from the inlet end of the main duct and being arranged such that the discharging opening of the transfer duct discharges into the inlet opening of the main duct;
  in the retracted stored position, the carriage frame being displaced along the guide track towards the second end of the guide track relative to the deployed position such that the transfer duct extends alongside the main duct;
  the carriage frame including a swivel formed therein which supports the transfer duct for pivotal movement relative to the guide track about an upright swivel axis in the deployed position.

2. The transfer apparatus according to claim 1 wherein the swivel further supports the transfer duct for pivotal movement relative to the guide track about a laterally oriented pivot axis oriented transversely to the upright swivel axis.

3. The transfer apparatus according to claim 2 wherein the swivel comprises a universal joint which defines the upright swivel axis and the laterally oriented pivot axis.

4. The transfer apparatus according to claim 2 further comprising (i) an upper mounting collar supported on the transfer duct, (ii) a lower mounting collar supported on the carriage frame and adapted to be in alignment with the inlet opening of the main duct in the deployed position, and (iii) an angularly adjustable tubular member connected between the upper and lower mounting collars.

5. The transfer apparatus according to claim 4 wherein the angularly adjustable tubular member comprising a tube of flexible material.

6. The transfer apparatus according to claim 1 further comprising a drive motor supported on the carriage frame and being operatively connected to the guide track so as to drive longitudinal displacement of the carriage frame along the guide track.

7. The transfer apparatus according to claim 6 further comprising a rack adapted to be mounted to extend in the longitudinal direction alongside the guide track and a drive gear coupled to the drive motor which is in meshing engagement with the rack, whereby the drive motor drives rotation of the drive gear to displace the carriage frame along the guide track as the drive gear is displaced along the rack.

8. The transfer apparatus according to claim 7 wherein the guide track is adapted to be supported on a top side of the main duct.

9. The transfer apparatus according to claim 7 in combination with the main conveyor wherein the main duct of the main conveyor comprises a tubular auger housing.

10. The transfer apparatus according to claim 7 wherein the guide track is arranged to span only partway along the length of the main duct.

11. The transfer apparatus according to claim 7 wherein the guide track comprising a pair of laterally spaced apart rails.

12. The transfer apparatus according to claim 1 further comprising an inlet hopper coupled to the inlet end of the transfer duct having a top opening spanning a top side of the inlet hopper, the inlet hopper being arranged to load material into the inlet end of the transfer duct.

13. The transfer apparatus according to claim 12 wherein the inlet hopper is pivotal relative to the transfer duct about a hopper axis oriented in a longitudinal direction of the transfer duct.

14. The transfer apparatus according to claim 13 wherein the inlet hopper is pivotal relative to the transfer duct through a range of at least 180 degrees between a working position in which the top opening faces upwardly, and a stored position in which the top opening faces downwardly, the carriage frame being movable into the retracted stored position with the inlet hopper in the stored position.

15. The transfer apparatus according to claim 12 further comprising extension wheels supported on the inlet hopper so as to be arranged for rolling movement along the ground in a longitudinal direction of the transfer duct as the carriage frame is displaced between the retracted stored position and the deployed position.

16. The transfer apparatus according to claim 12 further comprising swing wheels supported on the inlet hopper so as to be arranged for rolling movement along the ground in a lateral direction transversely to a longitudinal direction of the transfer duct as the transfer duct is pivotal about the upright swivel axis relative to the guide track in the deployed position of the carriage frame.

17. The transfer apparatus according to claim 16 further comprising extension wheels supported on the inlet hopper so as to be arranged for rolling movement along the ground in a longitudinal direction of the transfer duct as the carriage frame is displaced between the retracted stored position and the deployed position, wherein the swing wheels are movable relative to the extension wheels between a swing position in which the swing wheels engage the ground and the extension wheels are spaced above the ground and an extension position in which the extension wheels engaged the ground and the swing wheels are spaced above the ground.

18. The transfer apparatus according to claim 16 wherein the swing wheels are coupled to the transfer duct and wherein the inlet hopper is pivotal relative to the transfer duct and the swing wheels supported thereon about a hopper axis oriented in a longitudinal direction of the transfer duct.

19. The transfer apparatus according to claim 16 further comprising a swing drive motor operatively connected to the swing wheels to drive rotation of the swing wheels so as to drive pivotal movement of the transfer duct about the upright swivel axis relative to the guide track.

20. The transfer apparatus according to claim 1 in combination with a seed cart comprising the main conveyor supported thereon so as to be arranged for loading material into a seed tank on the seed cart in which the guide track is mounted on the main duct of the main conveyor, the transfer apparatus further comprising an inlet housing coupled to the inlet opening of the main duct in which the inlet housing has a top opening spanning a top side thereof which is aligned with the discharge opening of the transfer duct in the deployed position of the carriage frame.

* * * * *